US011283381B2

(12) United States Patent
Kawane et al.

(10) Patent No.: US 11,283,381 B2
(45) Date of Patent: Mar. 22, 2022

(54) POWER SYSTEM FOR A WORK VEHICLE

(71) Applicant: KUBOTA CORPORATION, Osaka (JP)

(72) Inventors: Masaru Kawane, Osaka (JP); Sumio Yagyu, Osaka (JP); Takao Nakagawa, Osaka (JP); Yukifumi Yamanaka, Osaka (JP); Go Takaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 79 days.

(21) Appl. No.: 16/916,293

(22) Filed: Jun. 30, 2020

(65) Prior Publication Data

US 2020/0336092 A1 Oct. 22, 2020

Related U.S. Application Data

(63) Continuation of application No. PCT/JP2019/018092, filed on Apr. 26, 2019.

(30) Foreign Application Priority Data

Apr. 27, 2018 (JP) .............................. JP2018-087253

(51) Int. Cl.
*H02P 9/02* (2006.01)
*H02J 4/00* (2006.01)
*A01C 17/00* (2006.01)

(52) U.S. Cl.
CPC ................. *H02P 9/02* (2013.01); *H02J 4/00* (2013.01); *A01C 17/001* (2013.01)

(58) Field of Classification Search
None
See application file for complete search history.

(56) References Cited

U.S. PATENT DOCUMENTS

| 4,306,402 A | 12/1981 | Whimp et al. |
| 2005/0046395 A1 | 3/2005 | Aoyama |
| 2013/0043838 A1 | 2/2013 | Tsuchiya |

(Continued)

FOREIGN PATENT DOCUMENTS

| GB | 2 397 563 A | 7/2004 |
| JP | 6214806 B1 | 10/2017 |

(Continued)

OTHER PUBLICATIONS

International Search Report issued in International Patent Application No. PCT/JP2019/018092, dated Jul. 23, 2019 and English Translation thereof.

(Continued)

*Primary Examiner* — Jared Fureman
*Assistant Examiner* — Joel Barnett
(74) *Attorney, Agent, or Firm* — Greenblum & Bernstein, P.L.C.

(57) ABSTRACT

A working machine includes: a first generator having: a rotor to be rotated by power from a PTO shaft; a rotor coil provided to the rotor; and a stator coil to generate electricity when magnetizing current is applied to the rotor coil; a working device to be operated by the electricity generated by the first generator; and a converter device to convert surplus electricity not consumed by the working device into the magnetizing current to be applied to the rotor coil.

10 Claims, 8 Drawing Sheets

(56) References Cited

U.S. PATENT DOCUMENTS

| | | | |
|---|---|---|---|
| 2015/0246622 A1* | 9/2015 | Ichikawa | B60L 1/08 |
| | | | 180/65.31 |
| 2016/0201295 A1* | 7/2016 | Kishimoto | B60K 6/445 |
| | | | 414/685 |
| 2017/0218910 A1* | 8/2017 | Sato | F02N 11/04 |
| 2018/0134384 A1 | 5/2018 | Ichihara et al. | |
| 2019/0000012 A1 | 1/2019 | Yagyu et al. | |

FOREIGN PATENT DOCUMENTS

| | | |
|---|---|---|
| RU | 2 550 867 C1 | 5/2015 |
| WO | 2017 030034 A1 | 2/2017 |

OTHER PUBLICATIONS

Extended European Search Report issued in European Patent Application No. 19792078.8 dated Jan. 7, 2022.

* cited by examiner

POWER SYSTEM FOR A WORK VEHICLE

CROSS-REFERENCE TO RELATED APPLICATIONS

The present application is a continuation application of International Application No. PCT/JP2019/018092, filed Apr. 26, 2019, which claims priority to Japanese Patent Application No. 2018/087253, filed Apr. 27, 2018. The contents of these applications are incorporated herein by reference in their entirety.

BACKGROUND OF THE INVENTION

Field of the Invention

The present invention relates to a working machine.

Description of Related Art

Patent Document 1 is previously known as a sprayer device for spraying a spraying substance. The sprayer device of Japanese Patent Publication No. 6214806 includes a storage portion that stores the spraying substance, a first sprayer portion that has a first rotor that sprays the sprayer substance, and a second sprayer portion that has a second rotor that sprays the sprayer substance, and a motor for operating the first sprayer portion and the second sprayer portion. This sprayer device is configured to be pulled by a traveling vehicle such as a tractor.

SUMMARY OF THE INVENTION

A working machine includes: a first generator having: a rotor to be rotated by power from a PTO shaft; a rotor coil provided to the rotor; and a stator coil to generate electricity when magnetizing current is applied to the rotor coil; a working device to be operated by the electricity generated by the first generator; and a converter device to convert surplus electricity not consumed by the working device into the magnetizing current to be applied to the rotor coil.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
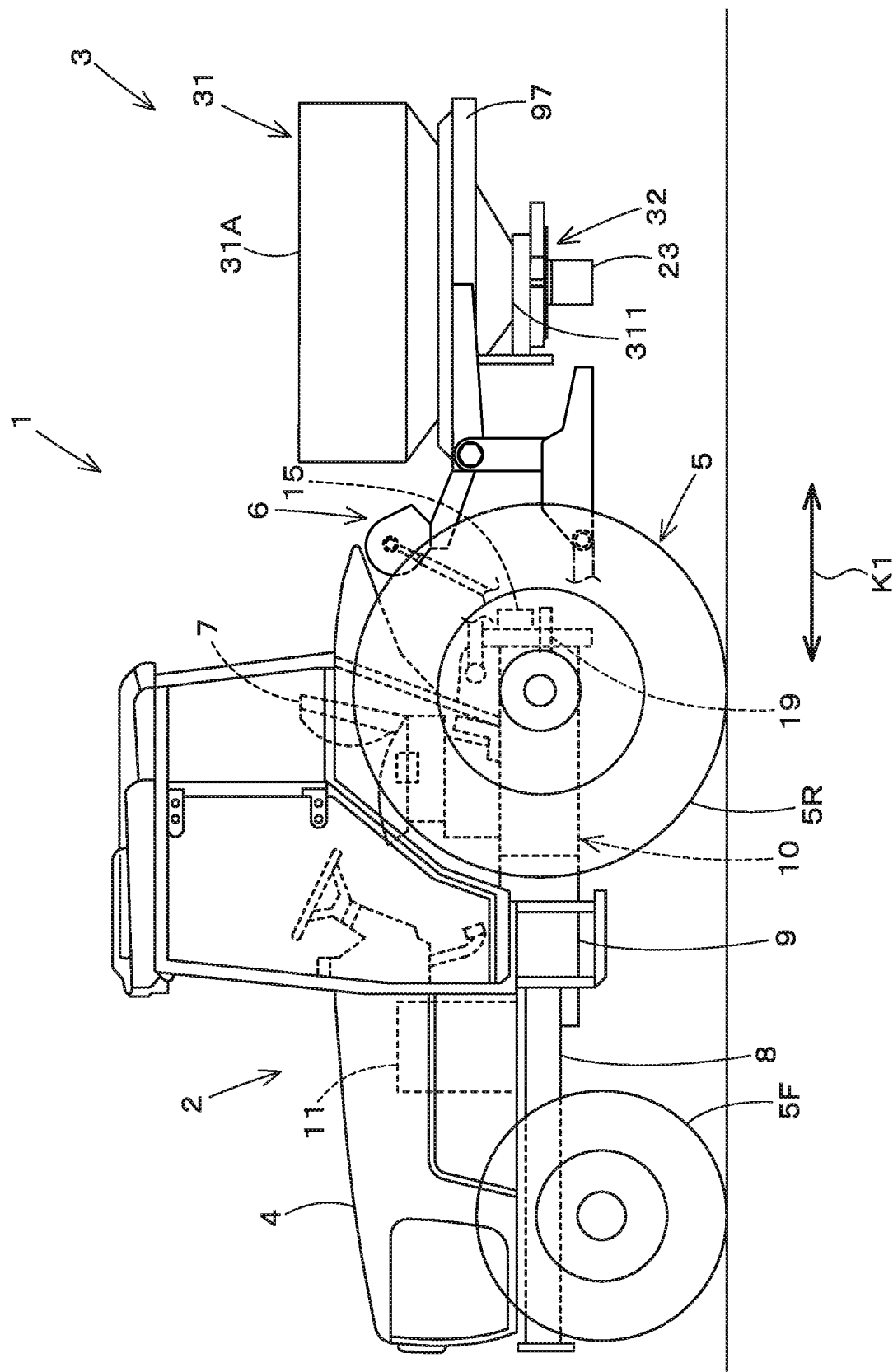
FIG. 1 is a side view illustrating a whole configuration of a working machine according to embodiments of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings as appropriate.

First Embodiment

First, the working machine 1 according to the present invention will be described.

Figure 2:
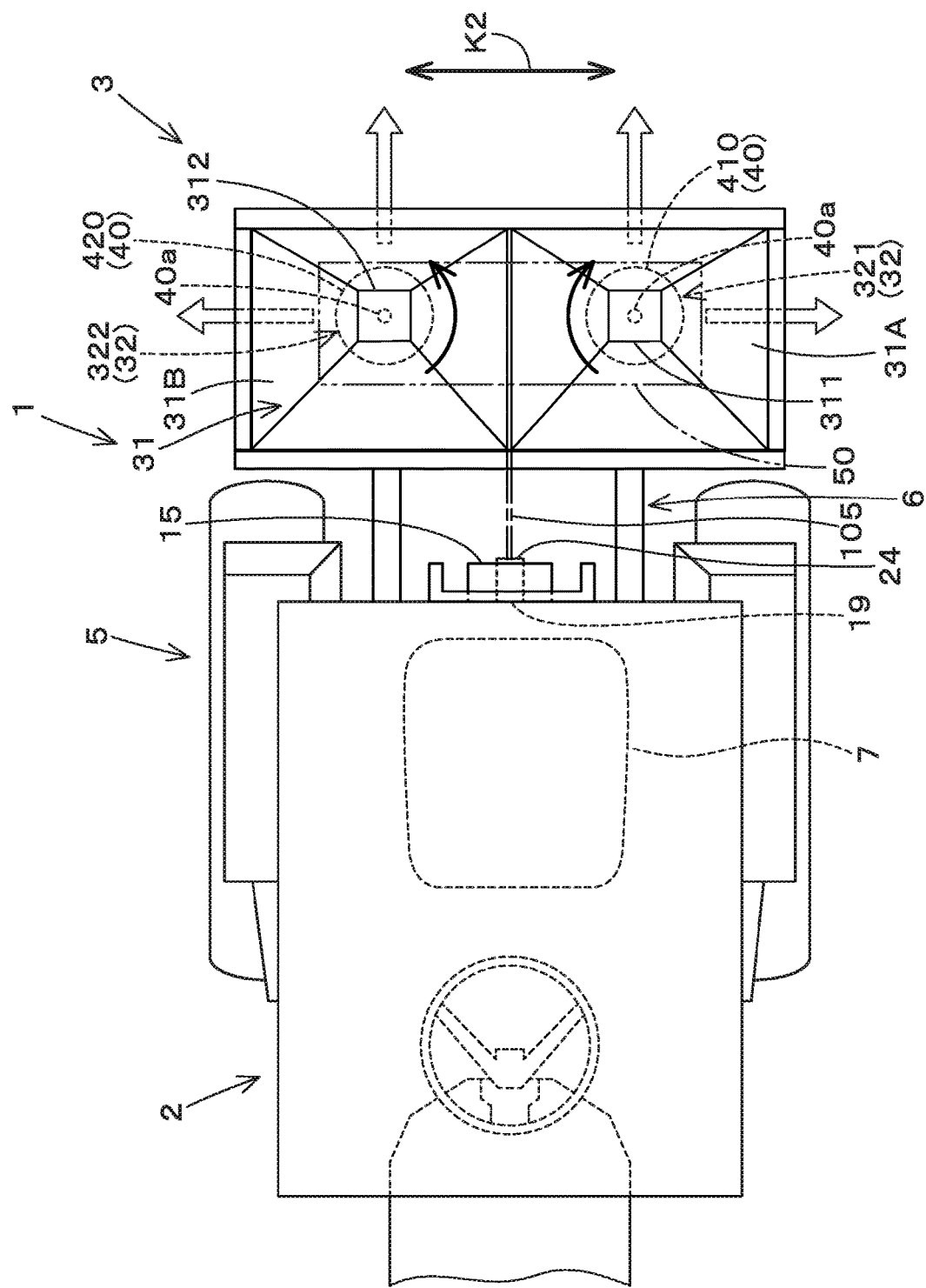
FIG. 2 is a plan view illustrating a rear portion of the working machine according to the embodiments.

FIG. 1 shows a side view of a whole of the working machine 1, and FIG. 2 shows a plan view of the rear portion of the working machine 1.

The working machine 1 includes a traveling vehicle 2 and a working device (implement or the like) 3.

The traveling vehicle 2 is a vehicle that travels while towing the working device 3. In the embodiment, since the traveling vehicle 2 is a tractor, the traveling vehicle 2 will be described as the tractor 2 below. However, the traveling vehicle 2 is not limited to a tractor, and may be an agricultural vehicle such as a combine harvester or a rice transplanter, or a construction vehicle. In addition, the traveling vehicle 2 may be a pickup truck, and the working device 3 may be capable of traveling independently without being towed by the traveling vehicle 2.

First, the overall configuration of the tractor (traveling vehicle) 2 will be described.

The tractor 2 includes a vehicle body 4, a traveling device 5, and a connector device 6. In the embodiment of the present invention, the front side of a driver sitting on the driver seat 7 mounted on the vehicle body 4 (the left side in FIG. 1) is referred to as the front, the rear side of the driver (the right side in FIG. 1) is referred to as the rear, the left side of the driver (the front surface side of FIG. 1) is referred to as the left, and the right side of the driver (the back surface side of FIG. 1) is referred to as the right. In addition, a horizontal direction K2 (see FIG. 2), which is a direction orthogonal to the front-rear direction K1 (see FIG. 1), will be described as a vehicle width direction.

The vehicle body 4 has a vehicle body frame 8, a clutch housing 9, and a transmission case 10. The vehicle body frame 8 stretches in the front-rear direction of the vehicle body 4. A prime mover 11 is mounted on the vehicle body frame 8. In the embodiment, the prime mover 11 is an internal combustion engine. In particular, the prime mover 11 is an engine, more specifically, a diesel engine. Hereinafter, the prime mover 11 will be described as the engine 11.

The engine 11 is mounted on the vehicle body frame 8 and arranged in the front portion of the vehicle body 4. The clutch housing 9 is connected to the rear portion of the engine 11 and accommodates the clutch. The transmission case 10 is connected to the rear portion of the clutch housing 9 and stretches rearward. The transmission case 10 accommodates a transmission 13 and a rear wheel differential device 14 which will be described later.

The traveling device 5 has a front wheel 5F provided on the front portion of the vehicle body 4 and a rear wheel 5R provided on the rear portion of the vehicle body 4. The front wheels 5F are supported by the vehicle body frame 8. The rear wheel 5R is supported by the output shaft of the rear wheel differential device 14. The traveling device 5 is a tire type in the present embodiment, but may be a crawler type.

The connector device 6 is a device for connecting the working device 3 to the rear portion of the tractor 2, the working device 3 being configured to perform the working (an agricultural work) on a field or the like. In the embodiment, the connector device 6 includes a three-point link mechanism. The configuration of the connector device 6 is not particularly limited as long as the working device 3 can be coupled to the rear portion of the traveling vehicle 2. For example, when the traveling vehicle 2 is a pickup truck, the connector device 6 connects the working device 3 by a mechanism other than the three-point link mechanism.

The traveling vehicle 2 includes an ECU (Electric Control Unit) that is a control unit for controlling electric components and the like mounted on the traveling vehicle. The ECU (hereinafter, referred to as "vehicle-side ECU") is constituted of a microprocessor including a CPU, an EEPROM and the like. The vehicle-side ECU and electric components are communicably connected via a line such as CAN (Controller Area Network).

The tractor 2 includes a PTO shaft 19 for transmitting power from an engine 11 that drives the tractor 2 to the working device or the like. The PTO shaft 19 protrudes rearward from the transmission case 10.

Figure 3:
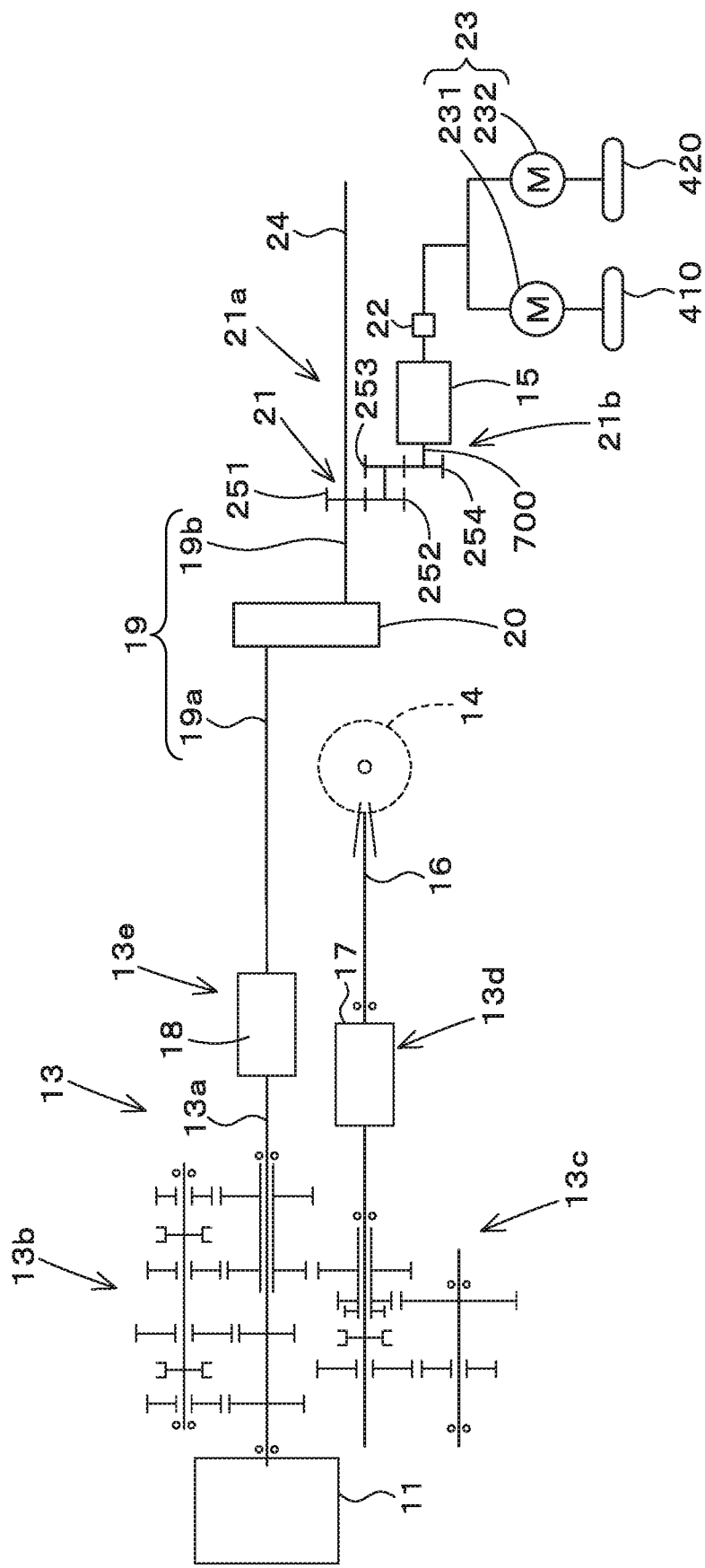
FIG. 3 is a view illustrating a power transmission system including an engine and a transmission device according to the embodiments.

FIG. 3 shows the power transmission system of the engine 11 and the transmission 13.

As shown in FIG. 3, the transmission 13 includes a main shaft (a propulsion shaft) 13a, a main transmission portion 13b, an auxiliary transmission portion 13c, a shuttle portion 13d, and a PTO power transmission portion 13e. The propulsion shaft 13a is rotatably supported by the housing case of the transmission 13, and the power from the crankshaft of the engine 11 is transmitted to the propulsion shaft 13a. The main transmission portion 13b has a plurality of gears and a shifter that changes the engagement of the gears. The main transmission portion 13b changes the rotating speed inputted from the propulsion shaft 13a and outputs (shifts) by appropriately changing the connection (engagement) of the plurality of gears with the shifter.

The sub-transmission portion 13c has a plurality of gears and a shifter for changing the connection of the gears, like the main transmission portion 13b. The sub-transmission portion 13c changes the rotating speed inputted from the main transmission portion 13b and outputs (shifts) the speed by appropriately changing the connection (engagement) of a plurality of gears with the shifter.

The shuttle portion 13d has a shuttle shaft 16 and a forward/backward switching portion 17. The power outputted from the sub-transmission portion 13c is transmitted to the shuttle shaft 16 through gears and the like. The shuttle shaft 16 is provided with the rear wheel differential device 14. A rear axle that supports the rear wheels is rotatably supported by the rear wheel differential device 14. The forward/reverse switch portion 17 is constituted of, for example, a clutch such as a hydraulic clutch or an electric clutch, and switches the rotation direction of the shuttle shaft 16, that is, the forward and backward movements of the tractor 2 by engaging and disengaging the clutch.

The PTO power transmission portion 13e has a PTO clutch 18 and a PTO shaft 19. The PTO shaft 19 is rotatably supported and can transmit power from the propulsion shaft 13a. The PTO shaft 19 has a PTO propulsion shaft 19a and a PTO output shaft 19b. The PTO propulsion shaft 19a is connected to the PTO output shaft 19b via the PTO transmission portion 20.

The PTO transmission portion 20 can change the rotating speed of the PTO propulsion shaft 19a and transmit the rotating speed to the PTO output shaft 19b by using an operating portion such as a PTO transmission lever. The PTO transmission portion 20 includes a speed-changing actuator such as an electromagnetic solenoid or an electric motor that can operate the operating portion based on a control signal from the controller portion (vehicle-side ECU).

The PTO clutch 18 is a clutch that can be switched between an engaging state in which the power of the propulsion shaft 13a is transmitted to the PTO shaft 19 and a disengaging state in which the power of the propulsion shaft 13a is not transmitted to the PTO shaft 19. In particular, the PTO clutch 18 is provided between the propulsion shaft 13a and the PTO propulsion shaft 19a. The PTO clutch 18 is constituted of a hydraulic clutch, an electric clutch, or the like, and when the clutch is engaged or disengaged, it is possible to switch the state between the state in which the power of the propulsion shaft 13a (power of the engine 11) is transmitted to the PTO shaft 19 and the state in which the power of the propulsion shaft 13a is not transmitted to the PTO shaft 19.

A power divider portion 21 is provided in the middle portion of the PTO output shaft 19b. The power divider portion 21 divides the rotary power transmitted to the PTO output shaft 19b into a first route 21a to output from the input shaft 24 connected to the PTO output shaft 19b and a second route 21b to transmit the rotary power to the first generator 15. The power divider portion 21 is constituted of a plurality of gears 251, 252, 253, and 254. However, the power divider portion 21 is not limited to the transmission mechanism having the gear, and may be another transmission mechanism (for example, a mechanism including a pulley and a belt, a mechanism including a sprocket and a chain, or the like).

The first generator 15 provided on the second path 21b is connected to the motor 23 via the inverter 22. The motor 23 is an electric motor, and is driven (rotated) by the power (electric power) from the first generator 15. The inverter 22 serves as a transmission that changes the rotating speed (revolving speed) of the motor 23. The number of the motors 23 to be driven by the power from the first generator 15 may be one or two or more. In the embodiment, the number of the motors 23 to be driven by the power from the first generator 15 is two. Hereinafter, two of the motors 23 will be respectively referred to as a first motor 231 and a second motor 232.

Next, the working device 3 will be described.

The working device 3 is a device for performing an agricultural work. In other words, the working device 3 is a device that works on an agricultural field. The working device 3 is driven by the electric power supplied from the tractor 2 to which the generator unit 12 is attached. As the working device 3, a working device capable of operating at a low voltage of 60V or less is preferably used. In particular, the working device 3 is preferably a sprayer device for spraying substances to the field, a seeder device for sowing seeds on the field, or a molding device (baler) for collecting and molding cut crops (grass or the like). As the sprayer device, a fertilizer sprayer device (spreader) that sprays fertilizer on the field, a chemicals sprayer device (sprayer) that sprays a chemicals (chemical agent) on the field, or the like is used. As the seeder device, for example, a seeder such as a drill seeder for sowing seeds, or a planter for sowing seeds at regular intervals is used. In the embodiment, the working device 3 is a sprayer device, and hence the following description will be made assuming that the working device 3 is the sprayer device 3.

As shown in FIG. 1 and FIG. 2, the sprayer device 3 includes a housing portion 31 and a spraying portion 32.

The housing portion 31 houses the spraying substances (fertilizer, pesticides, and the like) to be sprayed on the field.

The housing portion 31 is constituted of a hopper having a substantially inverted pyramid shape. The hopper includes a first hopper 31A and a second hopper 31B. The first hopper 31A is arranged on one side (the left side) in the vehicle width direction. The second hopper 31B is arranged on the other side (right side) in the vehicle width direction. However, the number of hoppers is not limited. The housing portion 31 has an inlet for the spraying substance at the upper end and has an outlet for taking out the spraying substance at the lower end. Although the number of outlets is not limited, in the embodiment, it is determined according to the number of rotors (disks) 40 to be described below. In particular, the number of rotors 40 is two, and the number of outlets is also two. Note that the number of rotors 40 may be two and the number of outlets may be one.

Figure 4:
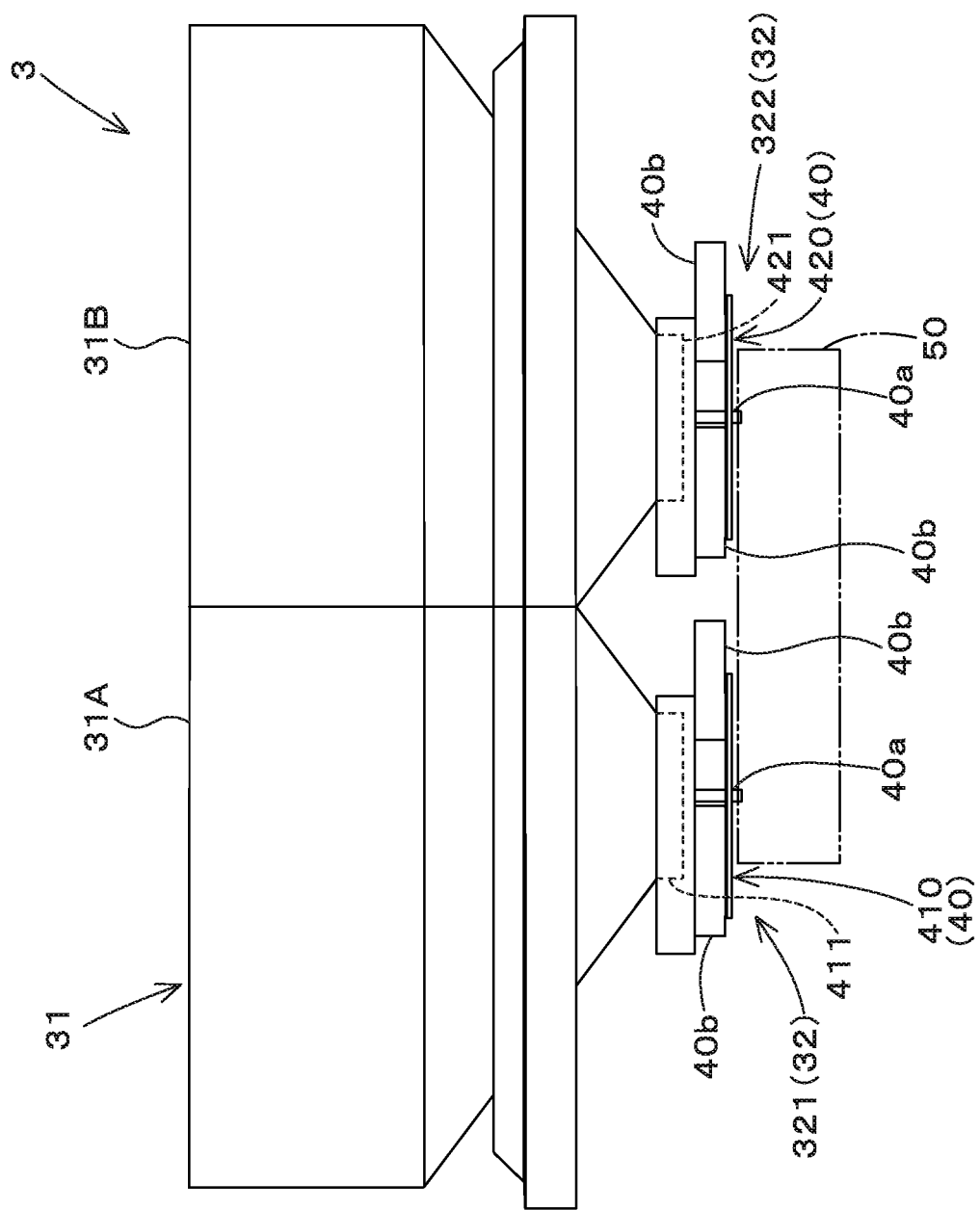
FIG. 4 is a back view of a sprayer device according to the embodiments.

The sprayer portion 32 is a working portion of the working device 3, and rotates to perform an agricultural work. The sprayer portion 32 sprays the spraying substance stored in the storage portion 31. As shown in FIG. 1 and FIG. 4, the sprayer portion 32 is provided below the housing portion 31. The sprayer portion 32 includes at least two or more sprayer portions. It is preferable that at least two or more sprayer portions have different spraying directions in all of the sprayer portions, but may include sprayer portions having the same spraying direction.

As shown in FIG. 2, the sprayer portion 32 includes a first sprayer portion 321 and a second sprayer portion 322. That is, in the embodiment, the number of the sprayer portions 32 is two. However, the number of the spray parts 32 is not limited to two, and may be three or more. The number of the sprayer portions 32 and the number of the rotors 40 are the same. The first sprayer portion 321 and the second sprayer portion 322 are provided along with the vehicle width direction. Hereinafter, the two sprayer portions (the first sprayer portion 321 and the second sprayer portion 322) will be described below.

The first sprayer portion 321 is arranged at the one side (the left side) of the vehicle width direction. The second spreader portion 322 is arranged at the other side (the right side) of the vehicle width direction. As shown in FIG. 2 and FIG. 4, the first spreader portion 321 has a first rotor 410 and a first shutter device 411.

The first rotor 410 has a disk shape and rotates about a center axis 40a extending in the longitudinal direction (the vertical direction). A plurality of rotor blades (blade members) 40b are attached to the upper surface of the first rotor 410. The rotor blade 40b rotates about the center axis 40a together with the first rotor 410. The plurality of rotor blades 40b are arranged at intervals in the circumferential direction, and extend from the vicinity of the center axis 40a toward the radially outward direction. The first rotor 410 rotates about the center axis 40a, so that the spraying substance falling from the first outlet 311 is applied to the rotary blades 40b to be scattered radially outward (radially outward).

The first shutter device 411 has a shutter and an electric motor (not shown in the drawings). The shutter is attached to one of the outlets (a first outlet) 311 of the housing portion 31, and the area (opening) of the first outlet 311 can be changed by moving the shutter. The electric motor is a stepping motor or the like, and is connected to the shutter. The first shutter device 411 changes the opening degree of the first outlet 311 by moving the shutter by driving the electric motor. As the result, the amount of spraying substance from the first sprayer 321 is adjusted.

As shown in FIG. 4, the second sprayer portion 322 includes a second rotor 420 and a second shutter device 421. The configuration of the second rotor 420 is the same as that of the first rotor 410, and thus the description thereof is omitted. The configuration of the second shutter device 421 is the same as that of the first shutter device, except that the shutter is attached to the other outlet (a second outlet) 312 of the housing portion 31. The second shutter device 421 can adjust the spray amount of the spraying substance from the second sprayer portion 322 by changing the opening degree of the second outlet 312.

As shown in FIG. 2, the first rotor 410 and the second rotor 420 are provided side by side in the vehicle width direction. As shown in FIG. 2 and FIG. 3, the first rotor 410 is rotated by the rotating power of the first motor 231, and the second rotor 420 is rotated by the rotating power of the second motor 232. The first rotor 410 and the second rotor 420 rotate in mutually different directions.

In the embodiment, as shown by the black arrowed line in FIG. 2, the first rotor 410 rotates in the clockwise direction and the second rotor 420 rotates in the counterclockwise direction in plan view.

The first rotor 410 is arranged below the first outlet 311 of the housing portion 31. The spraying substance that has fallen from the first outlet 311 is scattered by the rotating first rotor 410. The second rotor 420 is arranged below the second outlet 312 of the housing portion 31. The spraying substance falling from the second outlet 312 is scattered by the rotating second rotor 420.

In the embodiment, the spraying directions of the first sprayer portion 321 and the second sprayer portion 322 are different from each other. The spraying direction of the first sprayer portion 321 is one of the vehicle width direction and the rear side. The spraying direction of the second sprayer portion 322 is the other side and the rear side in the vehicle width direction. As shown by the white arrowed line in FIG. 2, in the embodiment, the main spraying directions of the first sprayer portion 321 are left and left rear, and the main spraying directions of the second sprayer portion 322 are right and right rear. The direction indicated by the white arrow is the main spraying direction, and actually it is spread in a fan shape including the direction shown by the white arrow.

Figure 5:
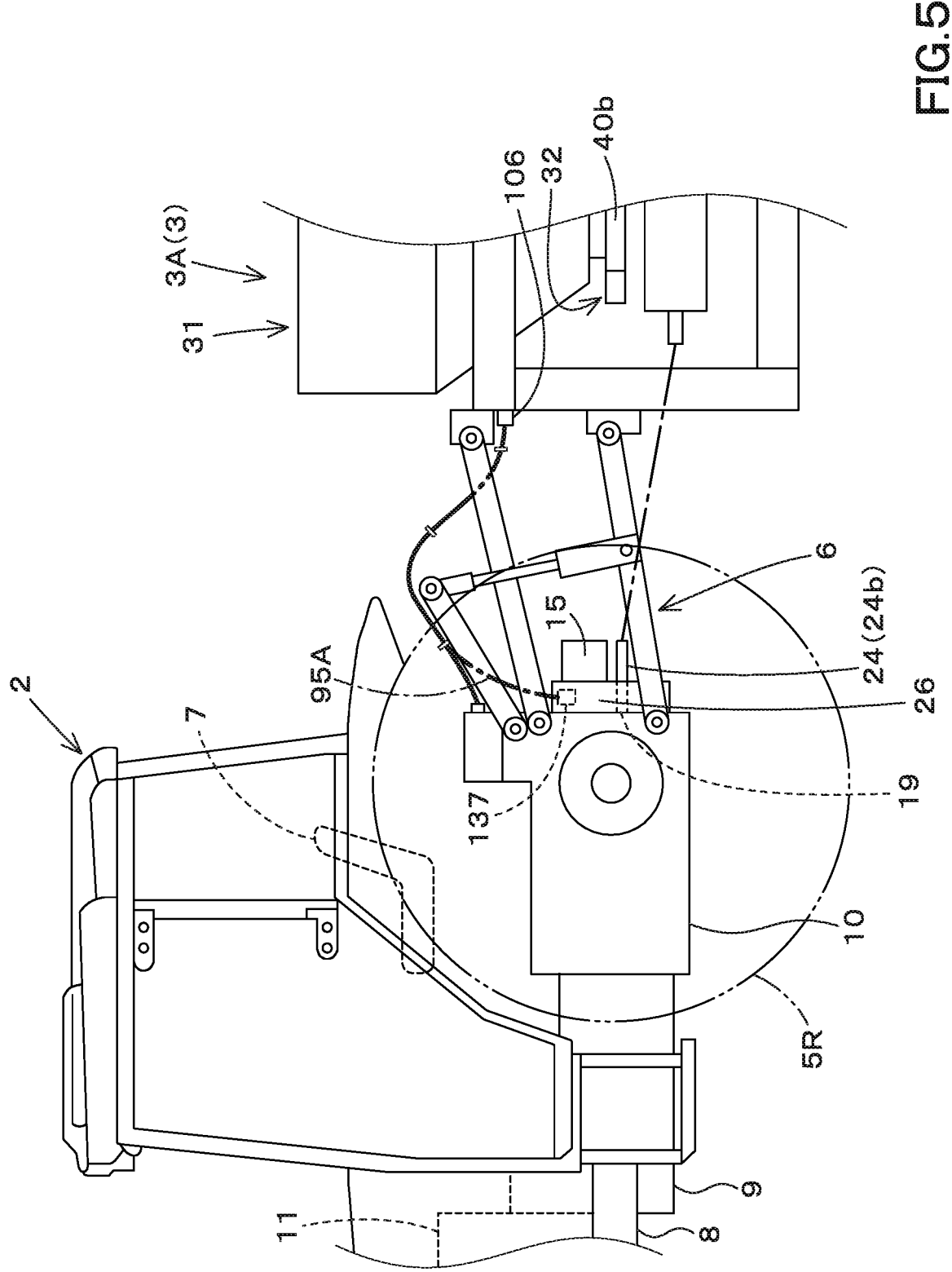
FIG. 5 is a side view illustrating a rear portion of a tractor to which the sprayer device is connected according to the embodiments.

As shown in FIG. 5, the first generator 15 is attached to the rear portion of the traveling vehicle 2 via the attachment frame 26. The connector (an output terminal) 137 of the first generator 15 and the connector (an input terminal) 106 provided in the working device 3 are connected by a power supply cable 95A. The electric power inputted to the connector 106 is supplied to the inverter 22, and the motor 23 (the first motor 231 and the second motor 232) is driven under the control of the inverter 22. That is, the motor 23 of the working device 3 is driven by the electric power generated by the first generator 15.

Figure 6:
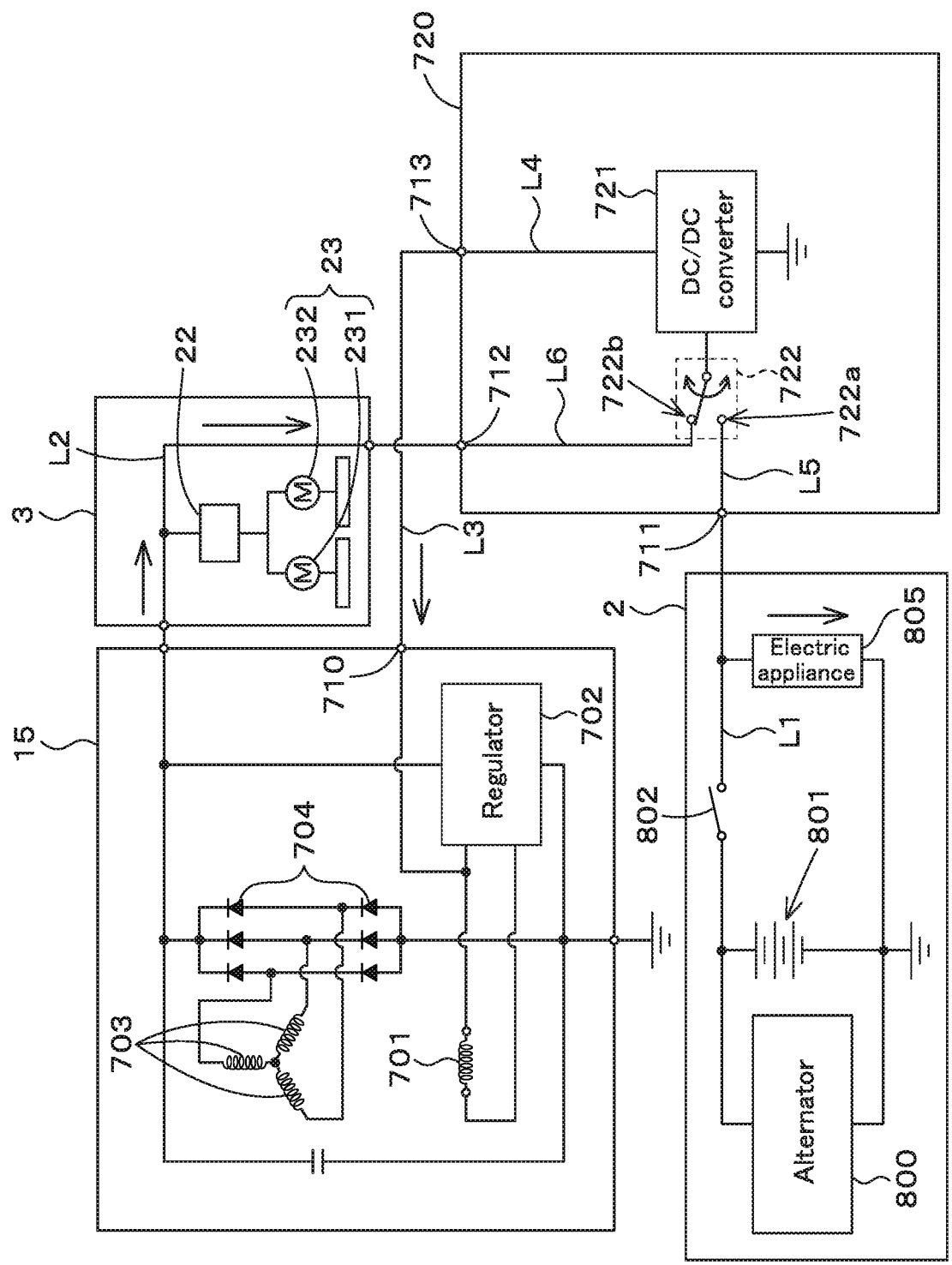
FIG. 6 is a view illustrating a generator system of the working machine according to a first embodiment of the present invention.

FIG. 6 shows a block diagram of a power generation system provided in the working machine. The power generation system will be described below in detail.

As shown in FIG. 6, the power generation system includes a first power generator 15 and a second power generator 800. The first generator 15 is a generator externally attached to the rear portion of the traveling vehicle 2 as described above, and the second generator 800 is a generator incorporated in the traveling vehicle 2.

First, the second generator 800 will be described. The second power generator 800 is a power generator that generates electricity by the power from the crankshaft of the engine 11, and is an alternator, for example. A first battery device 801 capable of storing the electricity generated by the second power generator 800 is connected to the second power generator 800. The first battery device 801 is, for example, a battery installed in the traveling vehicle 2 and stores the electricity generated by the second power generator 800. The second generator 800 and the first battery device 801 are connected to an electrical component 805 provided in the traveling vehicle 2 via the power line L1. The electrical component 805 is a component that is operated by the electric power of the second power generator 800 and/or the first battery device 801, and is a control device such as a CPU that controls the traveling vehicle 2 and the like, a sensor that detects various states, a solenoid valve that activate a hydraulic actuator and the like, a display device such as a monitor, and the like.

An ignition switch 802 is provided on the power line L1. When the ignition switch 802 is turned on, electric power (magnetizing current) from the first battery device 801 is outputted to the second power generator 800, and the second power generator 800 generates electricity. When the ignition switch 802 is turned off, the output of the magnetizing current to the second generator 800 is stopped, and the power generation of the second generator 800 is stopped.

As shown in FIG. 3 and FIG. 6, the first generator 15 is, for example, a generator whose output voltage is lower than 75V (less than 75V). According to the Low Voltage Directive (LVD) (2014/35/EU), electrical equipment used in the voltage range from DC 75V to 1500V is required to have safety conforming to this regulation. By setting the output voltage of the generator 15 to be lower than 75V, it can be used in a safer voltage range, which is lower than the voltage range specified by LVD.

In addition, the first generator 15 preferably has an output voltage of 60V or less. By using the first generator 15 having an output voltage of 60V or less, insulation measures are not required. Moreover, it is excellent in safety and can reduce the power consumption. Furthermore, the first generator 15 can be made smaller and lighter.

The first generator 15 has a rotor 700, a rotor coil (field coil) 701, a regulator 702, a stator coil 703, and a rectifier portion 704. The rotor 700 is rotatably supported by the housing case of the first generator 15, and is rotated by the rotational power of the gear 254 of the power divider portion 21 which branches the power supplied from the PTO shaft 19.

The rotor coil 701 is a coil on the rotation side and is a coil wound around the rotor 700. The regulator 702 is constituted of, for example, an IC chip having a plurality of switching elements, and controls the magnetizing current that magnetizes the rotor coil 701. The stator coil 703 is a fixed three-phase coil and is provided outside the rotor coil 701 in the housing case. When the rotor coil 701 rotates under a state where an magnetizing current is applied to the rotor coil 701, the stator coil 703 generates a three-phase AC induced electromotive force to generate power. The rectifier portion 704 is constituted of a diode or the like, and rectifies the induced electromotive force of the three-phase AC generated in the rotor coil 701.

As shown in FIG. 6, the first generator 15 is provided with an input terminal 710 for inputting an magnetizing current for exciting the rotor coil 701. The converter device 720 is connected to the input terminal 710 of the first generator 15 via a cable or the like. The converter device 720 is a device that converts the surplus electricity not consumed by the working device 3 into an magnetizing current to be added to the rotor coil 701.

The converter device 720 has a first input terminal 711, a second input terminal 712, and an output terminal 713. The first input terminal 711 is connected to the power line L1 provided on the traveling vehicle 2 side. The second input terminal 712 is a terminal to which a surplus current is inputted, and the power line L2 connected to either the inverter 22 or the motor 23 is connected to the second input terminal 712, for example. The power line L3 that connects the output terminal 713 and the input terminal 710 is connected to the output terminal 713.

The converter device 720 includes a DC/DC converter 721 and a first switch 722. The DC/DC converter 721 converts the input power into an magnetizing current, and outputs the converted magnetizing current (converted magnetizing current) to the power line L4 connected to the output terminal 713. The DC/DC converter 721 sets the conversion current to the rated magnetizing current, for example, when the rated magnetizing current is set as the magnetizing current required for power generation.

The first switch 722 is constituted of a relay switch, a semiconductor switch, or the like. The first switch 722 is connected to the first input terminal 711 and the second input terminal 712 via the power lines L5 and L6. The first switch 722 can be switched between a first position 722a and a second position 722b. The first position 722a is a position where the electric power inputted from the traveling vehicle 2 side to the first input terminal 711 is output to the DC/DC converter 721. The second position 722b is a position where the surplus current inputted from the working device 3 side to the second input terminal 712 is outputted to the DC/DC converter 721.

The switching of the first switch 722 is performed by the DC/DC converter 721 or a controller (not shown) provided in the converter device 720 separately from the DC/DC converter 721. Either the DC/DC converter 721 or the controller monitors the current (surplus current) inputted to the second input terminal 712. When the power generation of the first generator 15 is stopped and the surplus current is zero, either the DC/DC converter 721 or the controller switches the first switch 722 to the first position 722a. In particular, when the ignition switch 802 is OFF, the engine 11 is not started and the rotor 700 does not rotate, so that the first generator 15 is in the power generation stopping state. The switch 722 is kept in the first position 722a.

When the ignition switch 802 is turned on from such a state, the engine 11 starts and the rotation of the rotor 700 starts. When the ignition switch 802 is turned on, the power generated by the second generator 800 and the power of the first battery device 801 (vehicle-side power) are transmitted via the first power line L1, the power line L5, and the first switch 722 to the DC/DC converter 721. When the vehicle-side electric power is inputted to the DC/DC converter 721, the DC/DC converter 721 converts the vehicle-side electric power into an magnetizing current required for exciting the rotor coil 701, and the magnetizing current is outputted to the rotor coil 701. As the result, the first generator 15 generates electricity.

Here, in the first generator 15, when the number of revolving of the engine 11 (the number of rotations of the rotor 700) reaches a predetermined number of rotations, the amount of power generated by the first generator 15 reaches the required power generation amount necessary for the rotation of the working device 3 [the motor 23 (the first motor 231, the second motor 232)]. When the power generation amount (generated power) by the first generator 15 exceeds the required power generation amount, the working device 3 (the motor 23) does not consume the power. When the surplus electricity is supplied to the converter device 720, the DC/DC converter 721 or the controller switches the first switch 722 to the second position 722b. That is, the first switch 722 is switched to the second position 722b during power generation by the first generator 15.

According to this configuration, the surplus electricity not consumed by the working device 3 (motor 23) is inputted to the DC/DC converter 721 via the power line L6 and the first switch 722. When the surplus electricity is inputted, the DC/DC converter 721 converts the surplus electricity into an magnetizing current for the rotor coil 701 and outputs the magnetizing current to the power lines L4 and L3. The magnetizing current obtained by the surplus electricity is inputted to the regulator 702 via the first input terminal 710, and the rotor coil 701 is magnetized by the magnetizing current obtained by the surplus electricity. That is, when the first switch 722 is switched to the second position 722b, the magnetizing current is applied to the rotor coil 701 by the surplus electricity instead of the vehicle-side power.

The first switch 722 may switch to the first position 722a when the surplus electricity is less than the predetermined scheduled power while the first generator 15 is generating power, and the first switch 722 may switch to the second position 722b when the surplus electricity is equal to or greater than the planned power while the first generator 15 is generating power. In particular, one of the DC/DC converter 721 and the controller stores the planned power. Either of the DC/DC converter 721 and the controller switches the first switch 722 to the second position 722b when the surplus electricity being monitored exceeds the planned power, and the first switch 722 is switched to the first position 722a when the surplus current being monitored becomes less than the planned power.

The working machine 1 includes: the first generator 15 having: the rotor 700 to be rotated by power from a PTO shaft 19; the rotor coil 701 provided to the rotor 700; and the stator coil 703 to generate electricity when magnetizing current is applied to the rotor coil 701; the working device 3 to be operated by the electricity generated by the first generator 15; and the converter device 720 to convert surplus electricity not consumed by the working device 3 into the magnetizing current to be applied to the rotor coil 701. According to this configuration, of the electricity generated by the first generator 15, the surplus electric power not consumed by the working device 3 can be converted into an magnetizing current, and the converted magnetizing current can be added to the rotor coil 701. Thus, when the electricity is generated by the first generator 15, the electricity can be generated without taking the electric power for the magnetizing current from the traveling vehicle side such as the tractor, and the burden on the traveling vehicle side can be reduced.

The working machine 1 includes the traveling vehicle 2 to tow the working device 3, the traveling vehicle 2 having: the second generator 800 to generate electricity using power of the prime mover 11; and the first battery device 801 to store electricity generated by the second generator 800. The converter device 720 has: the DC/DC converter 721 to convert the inputted electricity into the magnetizing current; and the first switch 722 to switch between: the first position 722a to allow electricity of any one of the second generator 800 and the first battery device 801 to be outputted to the DC/DC converter 721; and the second position 722b to allow the surplus electricity to be outputted to the DC/DC converter 721. According to this configuration, the DC/DC converter 721 generates the magnetizing current (first magnetizing current) by using the electricity generated by the second generator 800, and the surplus electric power among the electric power generated by the first generator 15 is generated. The DC/DC converter 721 can be used to generate an magnetizing current (second magnetizing current). In addition, generation of the first magnetizing current and the second magnetizing current can be switched by the first switch 722.

In the working machine 1, the first switch 722 switches to the first position 722a when the first generator 15 is stopping generating electricity and switches to the second position 722b when the first generator 15 is generating electricity. According to this configuration, when power generation of the first generator 15 is stopped, power generation can be started by the first magnetizing current, while power generation can be continued by the second magnetizing current after the power generation.

The first switch 722 switches to the first position 722a when the first generator 15 is generating electricity and the surplus electricity is smaller than scheduled electricity preliminarily determined, and switches to the second position 722b when the first generator 15 is generating electricity and the surplus electricity is equal to or larger than the scheduled electricity. According to this configuration, when the surplus electricity is less than the constant power among the power generated by the first generator 15, the power is generated by the first magnetizing current, and when the surplus electricity is the constant power or more, the power can be generated by the second magnetizing current.

Second Embodiment

Figure 7:
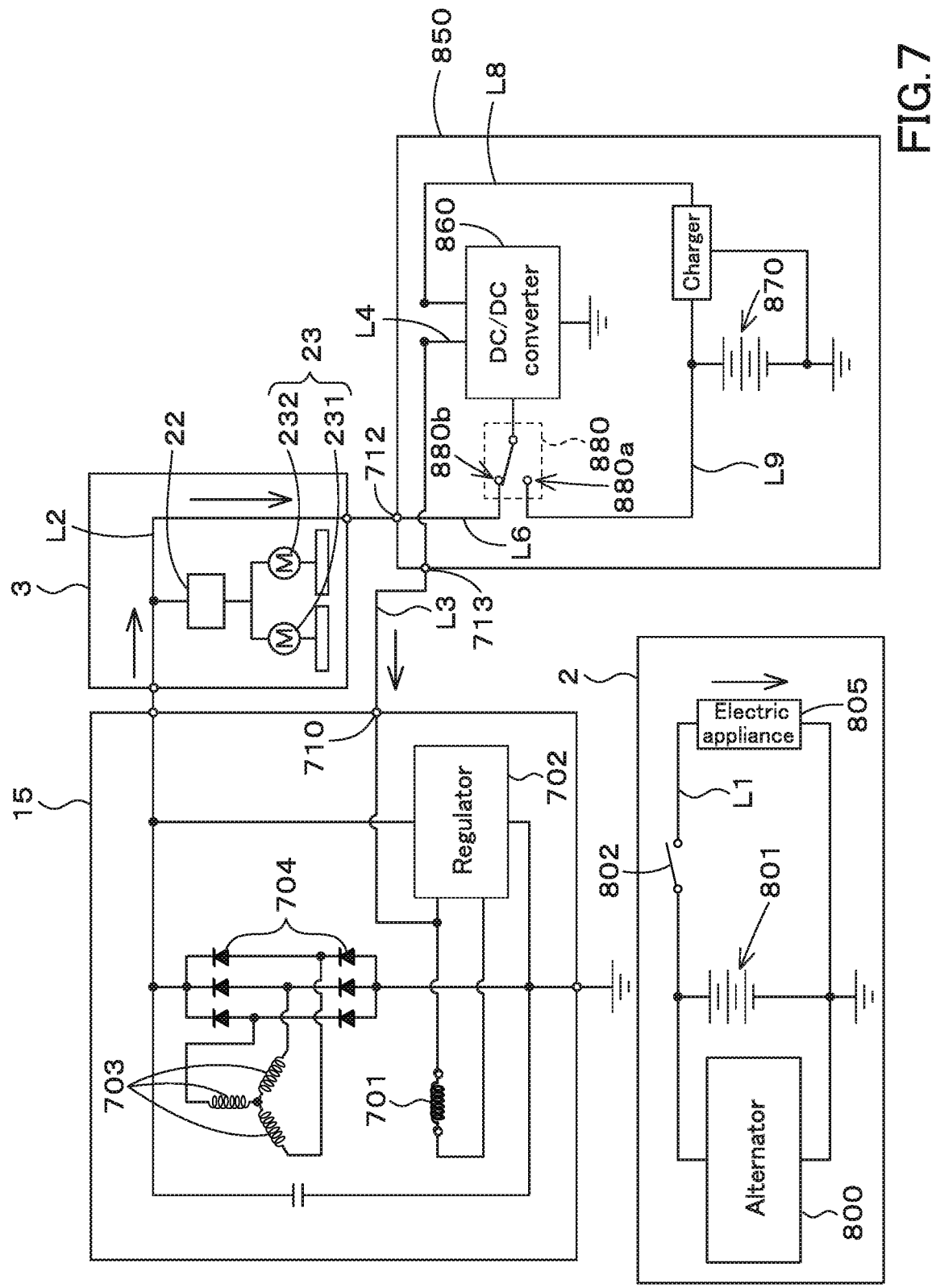
FIG. 7 is a view illustrating a generator system of the working machine according to a second embodiment of the present invention.

FIG. 7 shows a modified example of the power generation system of the working machine according to a second embodiment of the present invention. In the second embodiment, the description of the same configuration as the first embodiment will be omitted. The description will be made assuming that a generator system for the working machine in the second embodiment is also included in the working machine.

As shown in FIG. 7, the power generation system for the working machine includes a converter device 850. The converter device 850 is not connected to the power line L1 of the traveling vehicle 2 unlike the converter device 720 described in the above-described embodiment. On the other hand, the converter device 850 is connected to the working device 3 through the power supply line L2 and the like, similarly to the converter device 720. Similar to the converter device 720, the converter device 850 is a device that converts the surplus electricity not consumed by the working device 3 into an magnetizing current to be added to the rotor coil 701.

The converter device 850 has a second input terminal 712 and an output terminal 713. The configurations of the second input terminal 712 and the output terminal 713 are the same as those in the first embodiment.

The converter device 850 includes a DC/DC converter 860, a second battery device 870, and a second switch 880. The DC/DC converter 860 converts the input power into an magnetizing current, and outputs the magnetizing current (converted magnetizing current) to the power line L4. The DC/DC converter 860 sets the conversion current to the rated magnetizing current when the rated magnetizing current is set as the magnetizing current required for power generation. In addition, the DC/DC converter 860 outputs the surplus electricity to the power line L8 when the surplus electricity is large and there is a margin in generating the magnetizing current.

The second battery device 870 is, for example, a battery. The second battery device 870 is connected to the power line L8 connected to the DC/DC converter 860 and can store the surplus electricity outputted from the DC/DC converter 860. As shown in FIG. 7, a charger for charging may be connected to power line L8, but DC/DC converter 860 may also serve as the charger for charging.

The second switch 880 is constituted of a relay switch, a semiconductor switch, or the like. The second switch 880 is connected to the second input terminal 712 through the power line L6. In addition, second switch 880 is connected to second battery device 870 through power line L9. Thus, the surplus electricity stored in the second battery device 870 can be supplied to the second switch 880.

The second switch 880 can be switched between a third position 880a and a fourth position 880b. Third position 880a is a position allowing the electric power of second battery device 870 to be outputted to DC/DC converter 860. The fourth position 880b is a position allowing the surplus current inputted from the working device 3 side to the second input terminal 712 to be outputted to the DC/DC converter 860.

The switching of the second switch 880 is performed by the DC/DC converter 860 or a controller (not shown in the drawings) provided in the converter device 850 separately from the DC/DC converter 860. Either the DC/DC converter 860 or the controller monitors the current (excess current) inputted to the second input terminal 712. When the power generation of the first generator 15 is being stopped and the surplus current is zero (when the first generator 15 is stopping the power generation), one of the DC/DC converter 860 and the controller keeps the second switch 880 in the third position 880a. Thus, the electric power of second battery device 870 is supplied to DC/DC converter 860 through electric power line L9, and the electric power supplied to DC/DC converter 860 is converted into an magnetizing current to be outputted to electric power line L4. That is, the rotor coil 701 is magnetized by the magnetizing current obtained by the surplus electricity stored in the second battery device 870.

When the ignition switch 802 is turned on from such a state, the engine 11 is started, the rotation of the rotor 700 is started, and then the first generator 15 generates electricity. Here, in the first generator 15, when the number of revolving of the engine 11 (the number of rotations of the rotor 700) reaches a predetermined number of rotations, the amount of power generated by the first generator 15 reaches the required power generation amount necessary for the rotation of the working device 3 [the motor 23 (the first motor 231, the second motor 232)]. When the power generation amount (generated power) by the first generator 15 exceeds the required power generation amount, the working device 3 (the motor 23) does not consume the power. When the surplus electricity is supplied to the converter device 850, the DC/DC converter 860 or the controller switches the second switch 880 to the fourth position 880b. That is, the second switch 880 is switched to the fourth position 880b during power generation by the first generator 15.

According to this configuration, the surplus electricity not consumed by the working device 3 (motor 23) is inputted to the DC/DC converter 721 via the power line L6 and the second switch 880. When the surplus electricity is inputted, the DC/DC converter 860 converts the surplus electricity into an magnetizing current for the rotor coil 701 and outputs the magnetizing current to the power line L4. The magnetizing current obtained by the surplus electricity magnetizes the rotor coil 701. In addition, when the surplus electricity of the working device 3 is large, the surplus electricity is also outputted to the power line L8, and the surplus electricity can be stored in the second battery device 870.

The second switch 880 may switch to the third position 880a when the surplus electricity is less than the predetermined scheduled power while the first generator 15 is generating power, and the second switch 880 may switch to the fourth position 880b when the surplus electricity is equal to or greater than the planned power while the first generator 15 is generating power. In particular, one of the DC/DC converter 860 and the controller stores the planned power. Either of the DC/DC converter 860 and the controller switches the second switch 880 to the fourth position 880b when the surplus electricity being monitored exceeds the planned power, and the second switch 880 is switched to the third position 880a when the surplus current being monitored becomes less than the planned power.

Figure 8:
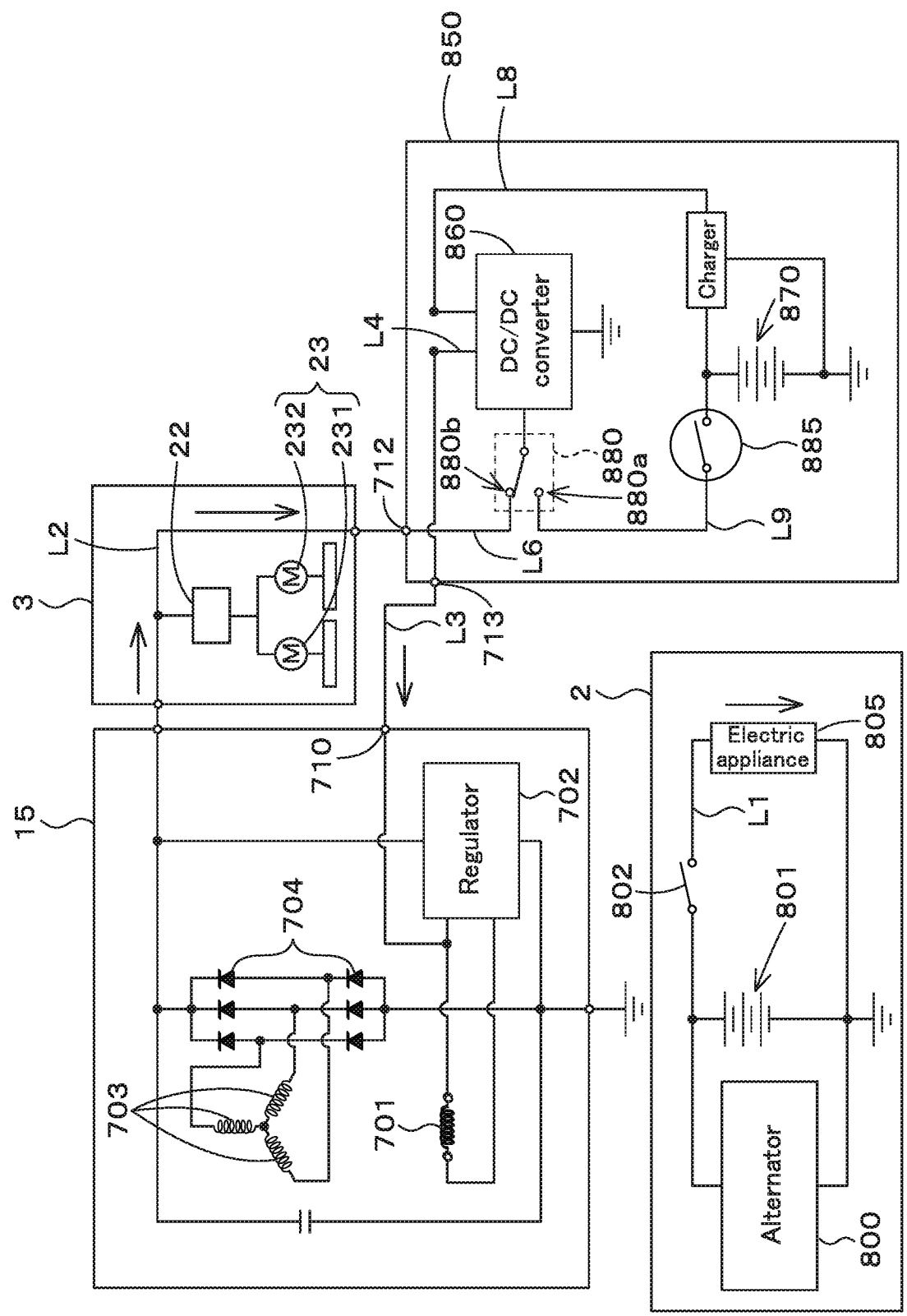
FIG. 8 is a view illustrating a modified example of the generator system of the working machine of FIG. 7.

In addition, as shown in FIG. 8, a linkage switch 885 that interlocks with the ignition switch 802 may be provided in the power line L9. The linkage switch 885 is OFF when the ignition switch 802 is OFF, and the surplus electricity stored in the second battery device 870 is not supplied to the DC/DC converter 860 even when the second switch 880 is in the third position 880a. In addition, the linkage switch 885 is ON when the ignition switch 802 is ON, and when the second switch 880 is at the third position 880a, the surplus stored in the second battery device 870 is supplied to the DC/DC converter 860. By providing the linkage switch 885 in this manner, power consumption of the second battery device 870 can be suppressed.

The converter device 850 has: the DC/DC converter 860 to convert electricity into the magnetizing current; the second battery device 870 to store the surplus electricity; and the second switch 880 to switch between: the third position 880b to allow electricity of the second battery device 870 to be outputted to the DC/DC converter 860; and the fourth position 880b to allow the surplus electricity to be outputted to the DC/DC converter 860. According to this configuration, the surplus electricity can be stored in the second battery device 870, and the magnetizing current (third magnetizing current) can be generated using the power stored in the second battery device 870 (surplus electricity). The second switch 880 switches whether to generate the magnetizing current (second magnetizing current) with the surplus current being generated by the first generator 15 or to generate the magnetizing current (third magnetizing current) with the electricity stored in the second battery device 870.

The second switch 880 switches to the third position 880a when the first generator is stopping generating electricity and switches to the fourth position 880b when the first generator is generating electricity. According to this configuration, when power generation of the first generator 15 is stopped, power generation can be started by the third magnetizing current, while power generation can be continued by the second magnetizing current after the power generation.

The second switch 880 switches to the third position 880a when the first generator is generating electricity and the surplus electricity is smaller than scheduled electricity preliminarily determined, and switches to the fourth position 880b when the first generator is generating electricity and the surplus electricity is equal to or larger than the scheduled electricity. According to this configuration, when the surplus electricity is less than the constant electricity among the electricity generated by the first generator 15, the electricity is generated by the third magnetizing current, and when the surplus electricity is the constant electricity or more, the electricity can be generated by the second magnetizing current.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:

1. A working machine comprising:
   a first generator having: a rotor to be rotated by power from a PTO shaft; a rotor coil provided to the rotor; and a stator coil to generate electricity when magnetizing current is applied to the rotor coil;
   a working device to be operated by the electricity generated by the first generator; and
   a converter device to convert surplus electricity not consumed by the working device into the magnetizing current to be applied to the rotor coil.

2. The working machine according to claim 1, comprising a traveling vehicle to tow the working device, the traveling vehicle having: a second generator to generate electricity using power of a prime mover; and a first battery device to store electricity generated by the second generator,
   wherein the converter device has:
      a DC/DC converter to convert the inputted electricity into the magnetizing current; and
      a first switch to switch between:
         a first position to allow electricity of any one of the second generator and the first battery device to be outputted to the DC/DC converter; and
         a second position to allow the surplus electricity to be outputted to the DC/DC converter.

3. The working machine according to claim 2,
   wherein the first switch switches to the first position when the first generator is stopping generating electricity and switches to the second position when the first generator is generating electricity.

4. The working machine according to claim 2,
   wherein the first switch switches to the first position when the first generator is generating electricity and the surplus electricity is smaller than scheduled electricity preliminarily determined, and switches to the second position when the first generator is generating electricity and the surplus electricity is equal to or larger than the scheduled electricity.

5. The working machine according to claim 1,
   wherein the converter device has:
      a DC/DC converter to convert electricity into the magnetizing current;
      a second battery device to store the surplus electricity; and
      a second switch to switch between:
         a third position to allow electricity of the second battery device to be outputted to the DC/DC converter; and
         a fourth position to allow the surplus electricity to be outputted to the DC/DC converter.

6. The working machine according to claim 5,
   wherein the second switch switches to the third position when the first generator is stopping generating electricity and switches to the fourth position when the first generator is generating electricity.

7. The working machine according to claim 5,
   wherein the second switch switches to the third position when the first generator is generating electricity and the surplus electricity is smaller than scheduled electricity preliminarily determined, and switches to the fourth position when the first generator is generating electricity and the surplus electricity is equal to or larger than the scheduled electricity.

8. The working machine according to claim 1,
   wherein the working device is a seeder device or a sprayer device.

9. The working machine according to claim 2,
   wherein the working machine is a tractor, and
   wherein the working device is a seeder device or a sprayer device.

10. The working machine according to claim 1,
    wherein the first generator outputs a voltage of 60V or less.

* * * * *